Sept. 6, 1932.   H. W. SMITH   1,876,319
DAY AND NIGHT REAR VISION MIRROR
Filed Oct. 11, 1930
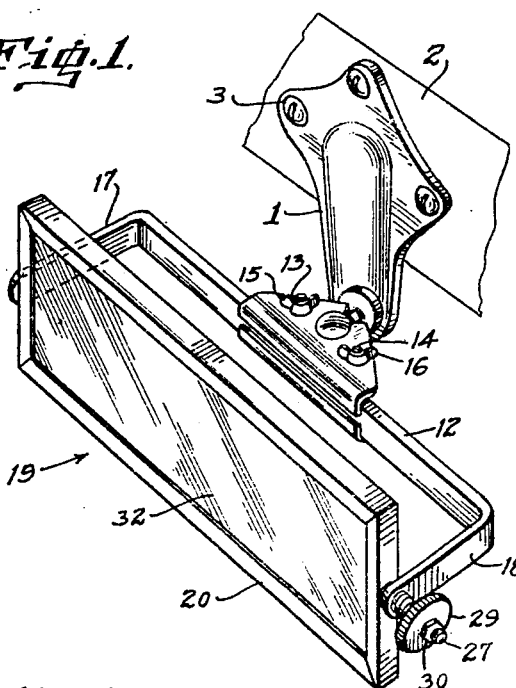
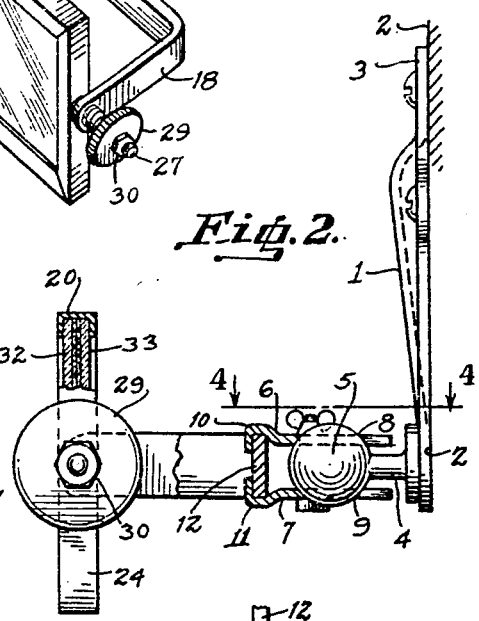
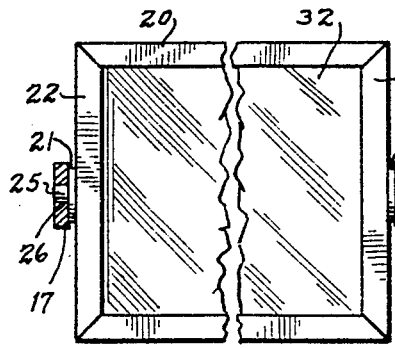
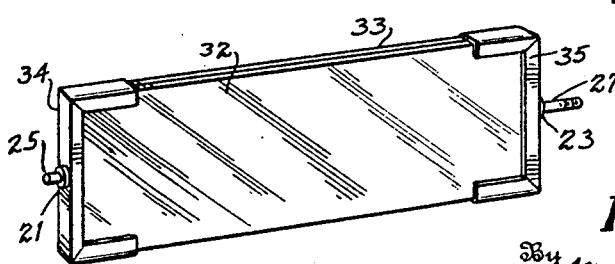
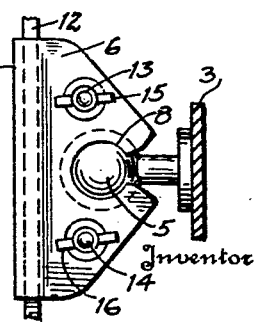
Herman W. Smith
By Mason Fenwick Lawrence
Attorneys Patented Sept. 6, 1932

1,876,319

UNITED STATES PATENT OFFICE

HERMAN W. SMITH, OF LOUISVILLE, KENTUCKY

DAY AND NIGHT REAR VISION MIRROR

Application filed October 11, 1930. Serial No. 488,091.

This invention relates to a new and useful improvement in mirror reflectors, adapted to be attached to the structure of an automobile, or other vehicle, above the windshield thereof, so that the driver of the vehicle may have a clear view to the rear of the vehicle at all times.

The main object of the invention is to provide a structure of this type with a reversible mirror, having one side adapted for use in daylight and the other side adapted for use in night driving only.

Another object of the invention is to provide a very simple and cheaply manufactured support for mirrors of this character which can be very readily applied to the structure of a vehicle above the windshield thereof, and which can be adjusted and held in every direction relative to its supporting structure.

With these and other objects in view as will appear as the description proceeds, the invention comprises the various novel features of construction, combination and arrangement of parts as will be more fully described hereinafter and afterward specifically claimed.

Referring to the drawing,

Figure 1 is a perspective of the mirror embodying this invention and applied to a fixed part of a vehicle above the windshield thereof;

Figure 2 is a central, vertical section through the structure shown in Figure 1, with part of said structure shown in elevation;

Figure 3 is a front elevation of the mirror part of said structure, with parts broken away and shown in section to illustrate details of a bracket for supporting said mirror rotatably;

Figure 4 is a horizontal section taken on the line 4—4 of Figure 2, and

Figure 5 is a perspective view of a modified form of mirror support.

As shown in the drawing, the invention comprises a bracket 1, adapted to be secured to a fixed member 2, of an automobile or other vehicle, by suitable securing means, such as the screws 3. From the lower end of the bracket 1, a stem 4, is secured perpendicularly to said bracket, and this stem 4, has a ball 5, secured to the free end thereof.

A pair of plates, 6 and 7, are provided with circular apertures 8 and 9 respectively, each of which is of smaller diameter than the diameter of the ball 5. These plates have their ends 10 and 11, respectively, bent to form channels in which a rectangular rod 12 is slidably mounted. The plates 6 and 7 are arranged on opposite sides of the ball 5, and are provided with clamp bolts 13 and 14 having thumb nuts 15 and 16 threaded thereon for frictionally securing said plates to the ball 5 and the said rod 12 in adjusted position between said plates and with respect to the ball 5.

The rod 12 has its opposite ends bent at right angles to the main body of said rod to form arms 17 and 18 between which the mirror structure 19 is pivotally mounted. The mirror structure 19 comprises a frame 20 having a bolt head 21 suitably secured to the end 22 of said frame, and having a similar bolt head 23 secured to the end 24 of said frame. The shank 25 of the bolt head 21 forms a trunnion rotatably mounted in the aperture 26 formed in arm 17 of the mirror supporting structure. The shank 27 of the bolt head 23 also forms a trunnion for the said frame and is journaled in an aperture 28 formed in the arm 18 of the mirror supporting structure.

The shank 27 is extended beyond the outer face of the arm 18 and has its outer end screw threaded to receive a clamping nut 29 and a lock nut 30. Surrounding the shank 27 and interposed between the arm 18 and clamping nut 29 is a coil spring 31 which serves to regulate the frictional engagement between the bolt head 23 and the inner face of the arm 18 in order to hold the mirror structure in any desired position of angular adjustment in its supporting framework.

It will be noted from the drawing that the mirror structure is not only adjustable angularly between the arms 17 and 18, but also that the clamping mechanism embodying the plates 6 and 7 is capable of adjustment in all directions on the ball 5. It will also be noticed that the distance between the trunnion axis of the shanks 25 and 27 and the adjacent ends of the clamping plates 6 and 7 is sufficient to allow the frame 20 to rotate freely between the arms 17 and 18 in order to reverse the frame for the purpose of presenting one side or the other of the mirror structure to the view of the driver.

For ordinary day driving, the frame 20 is provided with a mirror 32 of the usual silver type. The other side of said frame is provided with a sheet of clear glass 33, having the inner face thereof blackened to form a rear view mirror for night driving. The two mirrors of course are arranged back to back and are suitably secured in the frame 20.

It is not absolutely necessary that the night driving mirror be black, since any color may be used which will materially reduce the glare produced by an ordinary mirror in reflecting head lights to the rear of the rear of the vehicle during night driving. However, black is to be preferred because it positively eliminates all glare and enables the driver of a vehicle to proceed with safety.

In a modified form of the invention, shown in Figure 5, a pair of end clips 34 and 35 are used instead of the frame 20. Owing to the peculiar structure of the rod 12 and the arms 17 and 18 there is no strain put on the opposite ends of the frame 20, so that clips may be used instead of a frame. A bolt head and trunnion structure for supporting the mirrors 32 and 33 in these clips 34 and 35 is identical to that shown in the other figures of the drawing and the similar parts thereof are designated by the same reference characters.

The operation of the apparatus just described will be obvious from inspection of the drawing and need not be further described herein.

What I claim is:

1. In a rear vision mirror structure, the combination with a bracket, of a clamp pivoted universally on said bracket, a U-shaped support connected to said clamp and laterally slidable thereon for its full length, and a rear view mirror rotatably mounted in the ends of the side arms of said support.

2. In a rear vision mirror, the combination with a bracket, of a clamp pivoted for universal adjustment to said bracket, a U-shaped support slidably connected to said clamp, means for holding said clamp in adjusted position on said bracket and for holding said support in adjusted position in said clamp, a rear vision mirror, and means for mounting said mirror rotatably on the outer ends of the side arms of said support.

3. In a rear vision mirror, the combination with a bracket, of a support connected to pivot universally with respect to said bracket and to laterally slide thereon for its full length, and a rear vision mirror journaled in said support.

4. In a rear vision mirror, the combination with a bracket, of a clamp pivoted for universal adjustment on said bracket, a U-shaped support connected to said clamp and laterally slidable thereon for its full length, a frame having its opposite ends pivoted in side arms of said support, a bright reflecting mirror mounted in one side of said frame and a light absorbing mirror mounted in the other side of said frame.

In testimony whereof I affix my signature.

HERMAN W. SMITH.